US005734802A

United States Patent [19]
Maltz et al.

[11] Patent Number: 5,734,802
[45] Date of Patent: Mar. 31, 1998

[54] BLENDED LOOK-UP TABLE FOR PRINTING IMAGES WITH BOTH PICTORIAL AND GRAPHICAL ELEMENTS

[75] Inventors: Martin S. Maltz, Rochester; Steven J. Harrington, Fairport; Scott A. Bennett, Rochester, all of N.Y.

[73] Assignee: Xerox Corporation, Stamford, Conn.

[21] Appl. No.: 608,867

[22] Filed: Feb. 29, 1996

[51] Int. Cl.[6] .............. G06F 15/00; H04N 1/40; G03F 3/08
[52] U.S. Cl. .............. 395/109; 395/102; 395/114; 358/462; 358/515; 358/518; 358/520
[58] Field of Search ................ 358/518, 520, 358/523, 504, 501, 522, 515, 462, 540, 524; 395/109, 114, 126, 102; 382/254

[56] References Cited

U.S. PATENT DOCUMENTS

| | | | |
|---|---|---|---|
| 4,500,919 | 2/1985 | Schreiber | 358/518 |
| 5,195,175 | 3/1993 | Kanno et al. | 395/106 |
| 5,414,529 | 5/1995 | Terada et al. | 358/518 |
| 5,483,360 | 1/1996 | Rolleston et al. | |
| 5,500,921 | 3/1996 | Ruetz | 395/109 |
| 5,542,031 | 7/1996 | Douglass et al. | 395/109 |
| 5,592,591 | 1/1997 | Rolleston | 358/518 |

OTHER PUBLICATIONS

"Color Gamut Mapping and the Printing of Digital Color Images", by Maureen C. Stone, William B. Cowan and John C. Beatty, ACM Transactions on Graphics, vol. 7, No. 4, Oct. 1988.

"Gamut Mapping Computer Generated Imagery", by William E. Wallace and Maureen C. Stone, SPIE vol. 1460 Image Handling and Reproduction Systems Integration (1991) (The year of publication of this reference is sufficiently earlier than the effective U.S. filing date so that the particular month of publication is not an issue).

"A Comparison of Techniques for Color Gamut Mismatch Compensation", by R.S. Gentile, E. Walowit and J.P. Allebach, Journal of Imaging Technology, vol. 16, No. 5, Oct. 1990.

*Primary Examiner*—Edward L. Coles, Sr.
*Assistant Examiner*—Mark Wallerson
*Attorney, Agent, or Firm*—Fay, Sharpe, Beall, Fagan, Minnich & McKee

[57] ABSTRACT

A method and apparatus for blending pictorial and graphical look-up tables is provided. The blended look-up table, addressable by image signals from both pictorial and graphical objects, produces printer signals which are a blend of the output of the pictorial and graphical look-up tables. For image signals that are inside the pictorial gamut of the printer, only the output of the pictorial look-up table is used in the blended look-up table. For image signals that are outside the pictorial gamut, a blend of the output of both pictorial and graphical look-up tables is used in the blended look-up table. To blend the tables, graphical and pictorial image signals are selected from the surface of the graphical and pictorial gamut which have the same hue and luminance as the desired image signal. Printer signals output by both the graphical and pictorial look-up tables are weighted in accordance with the proportions of graphical and pictorial character container in the desired image signal, determined from the difference in saturation between the desired image signal and the selected graphical and pictorial image signals. The weighted printer signals are added and mapped to the desired image signal, the mapping being stored in an image signal translator.

20 Claims, 3 Drawing Sheets

BLENDED LOOK-UP TABLE FOR PRINTING IMAGES WITH BOTH PICTORIAL AND GRAPHICAL ELEMENTS

BACKGROUND OF THE INVENTION

The present invention relates to the art of document reproduction. It finds particular application in conjunction with printer reproduction of color image signals having both pictorial and graphical elements.

The generation of color documents can be thought of as a two step process. In the first step, RGB (Red, Green, Blue) image signals representative of the image are produced by a scanner or a work station (CRT display). Thereafter, a printer receives the RGB image signals, converts them to CMYK printer signals (Cyan, Magenta, Yellow, Key or Black), and generates a hard copy reproduction in accordance thereto. One problem with printers is that their print capabilities and colorants are uniquely defined. As a result, a select RGB image signal, when converted into a CMYK printer signal, may produce differing colors when printed by separate printers. To overcome this problem each printer is provided with a unique LUT (look-up table) for converting RGB image signals into proper CMYK printer signals.

The printer can print a limited range of colors ("gamut") as faithful reproductions of the intended color. Typically, the colors for images in the form of natural scenes such as are typically derived from a scanned image, as opposed to colors for images generated by the work station, correspond to a limited portion of the printer's available RGB gamut. These colors can be faithfully reproduced into CMYK printer signals by the printer because the LUT has been determined to accomplish a colorimetric match with the intended color of the user. In other words, RGB image signals with natural scene or pure pictorial content are within a "pictorial gamut" of the printer. However, certain RGB image signals, such as those relating to the colors of computer generated graph, are outside of the pictorial gamut of the printer and cannot be reproduced faithfully; typically, computer generated colors are more saturated than pictorial colors. In that computer-generated, saturated colors cannot be faithfully reproduced within the pictorial gamut of the printer, reproduction of such colors requires special translation, via a "graphical gamut," of the RGB image signals into CMYK printer signals before printing. Typical examples of such colors are work station generated pie charts, bar graphs, or text.

As noted, image signals from a scanner or work station must be translated into printer CMYK format prior to being printed. In known prior art systems, the translation is achieved using either a pictorial look-up table corresponding to the pictorial gamut or a graphical look-up table corresponding to the graphical gamut. Both gamuts are held in a printer color conversion memory and are used depending on the type of signal to be translated, i.e., whether it is a pictorial image signal or a graphical image signal. Pictorial LUTs translate image signals that are within the pictorial gamut. Graphical LUTs translate saturated graphical RGB image signals into the most fully saturated colors the printer is capable of making. Graphical LUTs cannot be used to translate pictorial image signals, and, conversely, pictorial LUTs cannot translate graphical image signals.

Some RGB image signals may contain both a graphical and a pictorial element. Some of these image signals are outside the pictorial gamut of a printer and cannot be translated into CMYK printer signals using merely the pictorial LUT. Likewise, the graphical LUT does not provide proper translation of these RGB images into CMYK printer signals since the graphical LUT is merely directed towards fully saturated image signals. The problem resolved by the subject development comprises how to translate image signals with graphical and pictorial elements when neither LUT can individually adequately accomplish the task.

One prior art solution to this problem involves compressing or clipping blended image signals outside the range of the pictorial gamut into image signals fully convertible by the pictorial LUT. These prior art techniques of clipping and compressing, however, fail to produce satisfactorily saturated graphic sweeps.

The present invention provides a new and improved technique for printer operation which overcomes the above-referenced problems and others.

SUMMARY OF THE INVENTION

According to one aspect of the present invention, a method is provided for generating a blended printer look-up table which translates image signals having both pictorial and graphical elements into an improved CMYK printer signal.

According to another aspect of the present invention, a pictorial look-up table for translating the pictorial image signals into printer signal equivalents is generated in accordance with characteristics of a particular printer. Thereafter, a graphical look-up table is generated for translating graphical image signals into printer signal equivalents. Blended pictorial/graphical printer signals are generated by weighting and combining printer signals from both the pictorial and graphical look-up tables. The weighting values are selected to be proportional to the respective pictorial and graphical contents in the corresponding blended image signals. The blended pictorial/graphical printer signals are mapped to the blended pictorial/graphical image signals and stored in a memory for future indexing.

According to another aspect of the present application, the pictorial and graphical printer signals selected for weighting and adding, are selected from corresponding image signals having the same hue, luminance and chroma. The printer signals are different because one is taken from a pictorial transformation, and the other is taken from a graphical transformation.

One advantage of the present invention is that it blends pictorial and graphical look-up tables to form a single printer look-up table used in printing high quality images.

Another advantage of the present invention is that it provides a single printer look-up table for translating blended image signals having both pictorial and graphical elements.

Yet another advantage of the present invention is that the reproduction of images using a single blended look-up table will exhibit accurate pictorial colors and satisfactorily saturated graphics and sweeps thereto.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

DETAILED DESCRIPTION OF THE PREFERRED EMBODIMENTS

Figure 1:
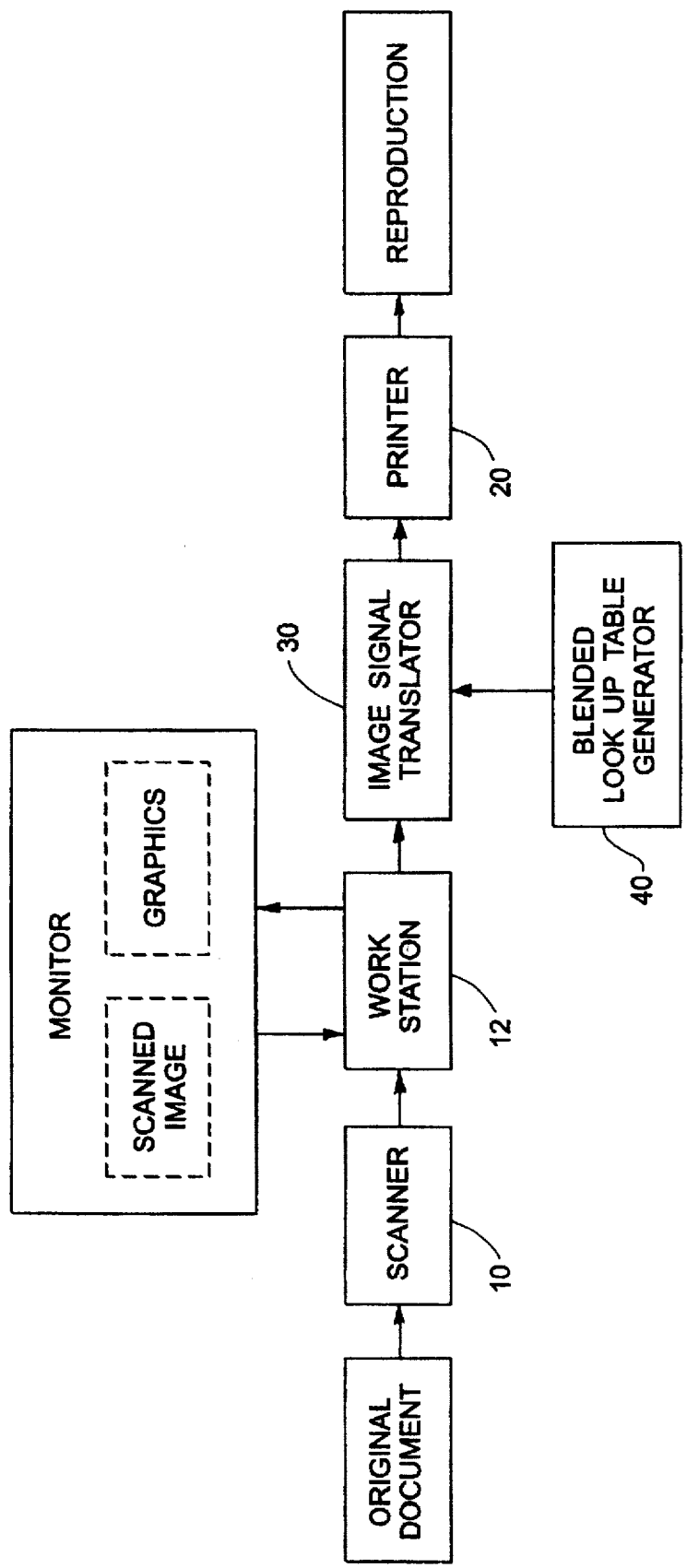
FIG. 1 is a schematic diagram of a scan to print system in which the present invention may find advantageous use.

With reference to FIG. 1, a scan to print system in which the present invention may find advantageous use, is shown. The remaining description of the instant invention will be described with reference to image signals generated by a scanner 10 and work station 12, it being understood that the present invention is primarily applicable to reproducing a computer-generated image comprising a blending of elements of both. A typical example would comprise a scanned in photograph being printed with computer generated text or associated diagrams. The text could be printed in a special color such as a fully saturated red or the diagram could include a color sweep from a white to a red within the pictorial gamut up to the fully saturated red.

FIG. 1 shows the scanner 10 which generates image signals representing a pictorial or natural scene image of an original document. The image signals are generated by sensing elements which convert light reflected from the original document placed on a copying platen of the scanner. Initially, the image signals are generated in RGB (red-green-blue) format or space.

Work station 12 receives RGB signals representing a scanned natural scene of the original document. Work station 12 may be used to add text or graphics thereto.

Printer 20 reproduces the original document with added text or graphics by adding multiple layers of ink or colorant to a printing medium such as paper. Typically, the printer operates in accordance with a set of color signals defined in CMYK space which is uniquely defined for the printer by its capabilities and colorants. Thus, before the printer can operate to reproduce an original document, the original RGB image signals must be converted into equivalent CMYK printer signals.

Image signal translator 30 stores printer look-up tables which map image signals defined in RGB space to printer signals defined in CMYK space. Typically, the image signal translator stores the printer look-up tables in ROM or RAM memory with the look-up tables addressable by image signals in RGB format. The look-up table is commonly a three dimension table since color is defined with three variables. In the RGB format, image signal space can be defined as three dimensional with black at the origin of the three dimensional coordinate system 0, 0, 0 and white at the maximum of the three dimensional coordinate system which, for an 8 bit system, would be located at 255, 255, 255. Each of the three axes radiating from the origin point therefore respectively defines red, green, and blue. In the 8 bit system suggested, there will be over 16 million possible colors. Clearly, there are too many values for a one to one mapping of RGB image signals to CMYK printer signals. Therefore, the printer look-up table consists of a set of values which could be said to be intersections for corners of a set of cubes mounted one on top of another. Colors falling within each cube can be interpolated from measured values, through many methods including trilinear interpolation, tetrahedral interpolation, polynomial interpolation, linear interpolation, and any other interpolation method depending on the desired accuracy of the result.

Printer 20 has a limited range or space, defined above as the pictorial gamut, of colors that it can produce accurately so that a colorimetric match exists between the scanned in colors or CRT phosphors, and the colors that the printer imparts to the printing medium. Printers may also be requested to print saturated colors outside of this pictorial gamut, such as those produced as computer-generated graphics. These colors are found on the outer boundary of the RGB space of possible colors producible using the assumed RGB primaries, i.e., the graphical gamut. These more saturated colors are clearly outside the pictorial gamut and incapable of being correctly translated by the pictorial look-up table. Accordingly, a second look-up table is required for translating saturated or graphical image signals. This second or graphical look-up table, like the pictorial look-up table, may be stored in ROM or RAM memory within the image signal translator and is addressable by the RGB graphical image signal.

The pictorial look-up table is generated by first operating the printer with printer signals selected to cause the printer to print samples on a medium. The color samples are measured to determine a first colorimetric response to the printer signals. The colorimetric response is used to generate a first mapping of colorimetric signals to printer signals. Thereafter, the first measured colorimetric response may be used to generate an additional mapping of colorimetric values to printer signals. Ultimately, a color conversion mapping is generated as a function of the first or additional mappings and stored in a color conversion memory.

The graphical LUT is produced by mapping saturated RGB signals (normalized to be between 1 and 0) to C,M,Y,K printer-signals using the relationship $C=1-R$, $M=1-G$, and $Y=1-B$, though modifications are sometimes required; for example, when printer blue (100%C & 100%M) is too dark and hue shifted. For less than 100% saturated colors, K is determined and CMY are correspondingly decreased using well-known methods. These modifications are made in such a way that RGB between 0 and 1 map to CMYK between 1 and 0.

As described above, the prior art was unable to overcome the problem that arises when blended image signals having both pictorial and graphical characteristics are sought to be printed. These blended image signals can be thought of as being between the pictorial gamut and the outer boundary of the RGB space where the saturated colors lie. Neither the pictorial look-up table nor the graphical look-up table provides a suitable translation of blended image signals into CMYK space. While the pictorial look-up table can translate pictorial image signals into printer signals with accurate results, and while the graphical look-up table can translate graphical image signals into printer image signals exhibiting saturated colorant, neither the pictorial nor the graphical look-up tables individually provide satisfactory translation of blended image signals to printer signals.

The present invention remedies this problem by generating a blended look-up table using a blended look-up table generator 40. The blended look-up table comprises added weighted printer signals from each of the pictorial and graphical look-up tables. The added signals are mapped to a corresponding image signal and stored in memory of the image signal translator. Once generated, the blended look-up table operates to translate image signals which are outside the pictorial gamut but lacking the saturated characteristics associated with the graphical image signals. With respect to image signals which are predominantly pictorial in nature, the look-up table produces a printer signal in which the pictorial mapping predominates. With respect to image signals far outside the pictorial gamut of the printer, the blended look-up table produces a printer signal in which the graphics mapping predominates.

Figure 2:
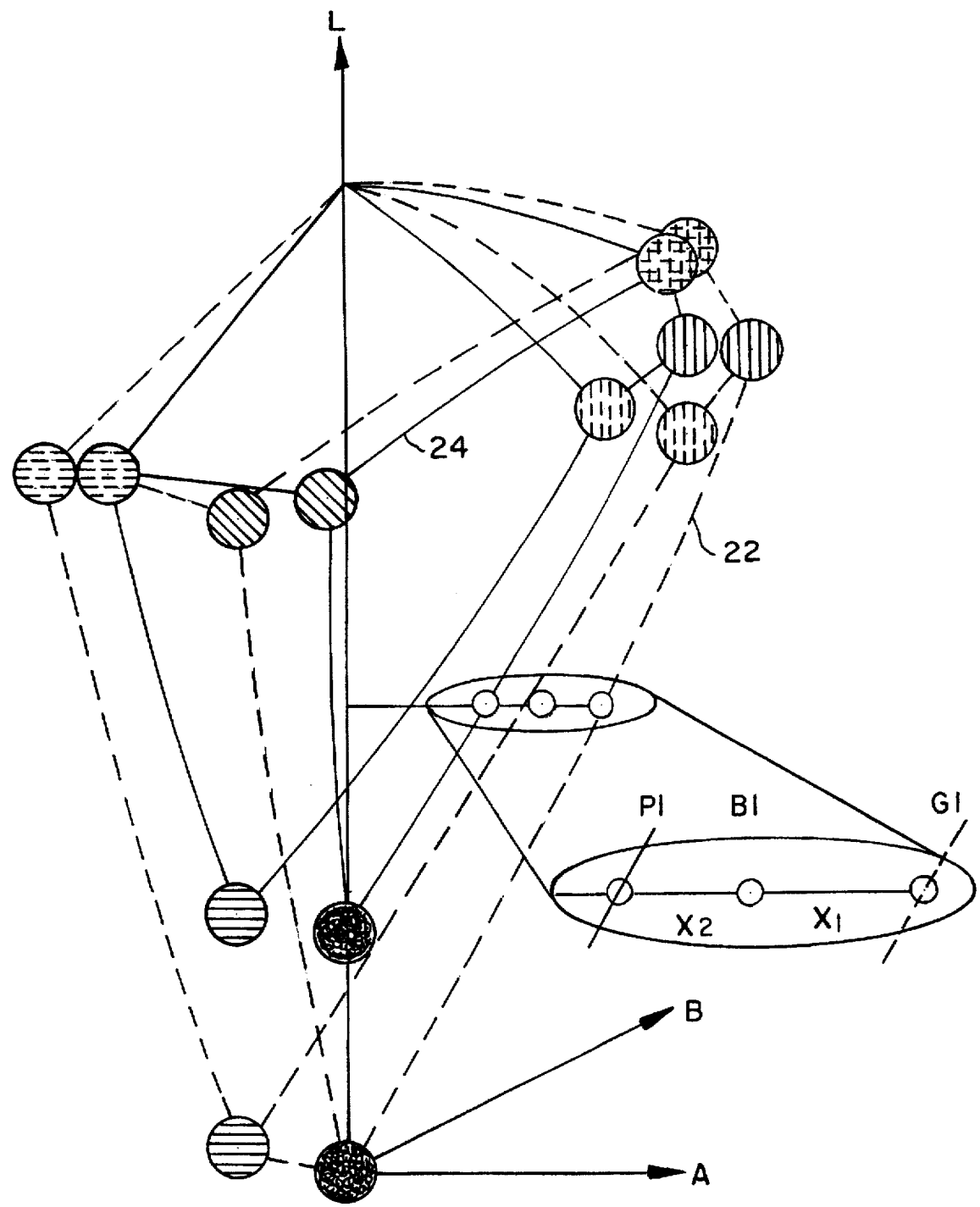
FIG. 2 is a graphical representation in luminance, hue, saturation space of the RGB space boundary and the pictorial gamut boundary for a typical printer.

With reference to FIG. 2, the theory of the present invention will now be explained. FIG. 2 graphs the available RGB space gamut and a typical pictorial gamut in a hue/luminance/saturation space such as LAB space. The outer boundary of the available RGB space, after translation to LAB space, is shown by a dashed line 22. The pictorial gamut, shown as a solid line 24, defines the range of colorimetric matching colors that the printer can faithfully provide. The available color space is limited since the initial RGB space is defined in terms of numbers that range from 0–255. Since the pictorial gamut is limited by the range of colors the printer can faithfully reproduce, the pictorial gamut falls inside the graphical gamut. As a result, pictorial look-up tables, when translated into LAB space, map printer signals which fall within the pictorial gamut. The saturated signals of the graphical look-up table lie on the RGB space outer boundary.

In LAB space, a line extending perpendicular to the L axis defines a range of colors having constant hue and varying saturation. Colors farther away from the L axis, but on a constant hue line, are more saturated. Within the LAB space, B is associated with a range between yellow and blue while A is associated with a range between red and green. If A is positive, the color associated is reddish while a negative A exhibits greenish color. When the B value is positive, the color exhibited is yellow while a negative B value exhibits a bluish color. As positions within the LAB space swing toward the negative B axis, the colors turn more bluish. It should be noted, however, that with respect to lines drawn perpendicularly from the L axis, each value along this line exhibits a constant hue.

As noted above, the printer can reproduce signals contained within the pictorial gamut using a pictorial LUT. Additionally, the printer is capable of handling requests to produce the more saturated colors found on the RGB gamut outer boundary using a graphical LUT. Blended pictorial/graphical printer signals can be generated by weighting and thereafter adding printer signals from both the pictorial and graphical look-up tables. The weighting values are selected to be proportional to the pictorial and graphical contents in the corresponding image signals. Colors between the printer gamut and RGB space gamut boundary contain both pictorial and graphical elements. Image signals corresponding to these colors "between" the gamuts, cannot be accurately translated using either the graphical or the pictorial look-up tables. However, the pictorial and graphical look-up tables can be combined in such a way to produce printer signals which generate satisfactory colors associated with signals between the two gamuts. The graph of FIG. 2 shows a perpendicular line extending from the L axis on which three points $P_1$, $B_1$, and $G_1$ can be found. Since these three points lie on a line extending from the L axis, colors associated with these three points exhibit the same image signal luminance and hue. The $P_1$ point defines a color signal at an intersection of the constant hue line with the pictorial gamut at a point which defines an image signal the color of which is accurately reproducible by the printer. Note that alternatively, a point slightly interior to the pictorial gamut could be used. The $G_1$ point represents a color signal at an intersection of the constant hue line with the RGB outer boundary at a point which defines an image signal corresponding to a saturated requested color. $B_1$ represents a desired image signal between the two gamuts such as would be generated from a work station produced color sweep. $B_1$ is separated from $P_1$ and $G_1$ by a difference in chrominance (or saturation) $X_2$ and $X_1$ respectively. Given these differences, $X_2$ and $X_1$, a blended printer signal comprising a weighted sum of the printer signals associated with the pictorial and graphical mapping can be calculated and mapped to a blended look-up table. The weighting values are calculated as follows.

The position of $B_1$ with respect to $P_1$ and $G_1$ determines the value of weighting value F. F is equal to 1 when $P_1$ and $B_1$ are equal in position, and when $B_1$ is inside the pictorial gamut. F reduces in magnitude as $B_1$ moves away from the printer gamut P towards G. F approaches 0 when $B_1$ and $G_1$ coincide, which is at the outer boundary of the RGB gamut. Thus, F is a function of:

$$\frac{x1}{x1+x2}$$

Given F, the printer signal $LUT_{pictorial}$ ($B_1$) is multiplied by F and the graphics printer signal $LUT_{graphics}$ ($G_1$) is multiplied by (1−F) the results of which are added to form the blended printer signal which is mapped to a corresponding image signal. Given the mapped image signals to blended printer signals, image signals associated with colors close to the printer gamut provide colorants in which the pictorial mapping predominates. For colors far outside the printer gamut, the graphics mapping predominates.

Note that the above explanation described blending along a line of constant hue and lightness, but other reasonable blending trajectories can be found.

Figure 3:
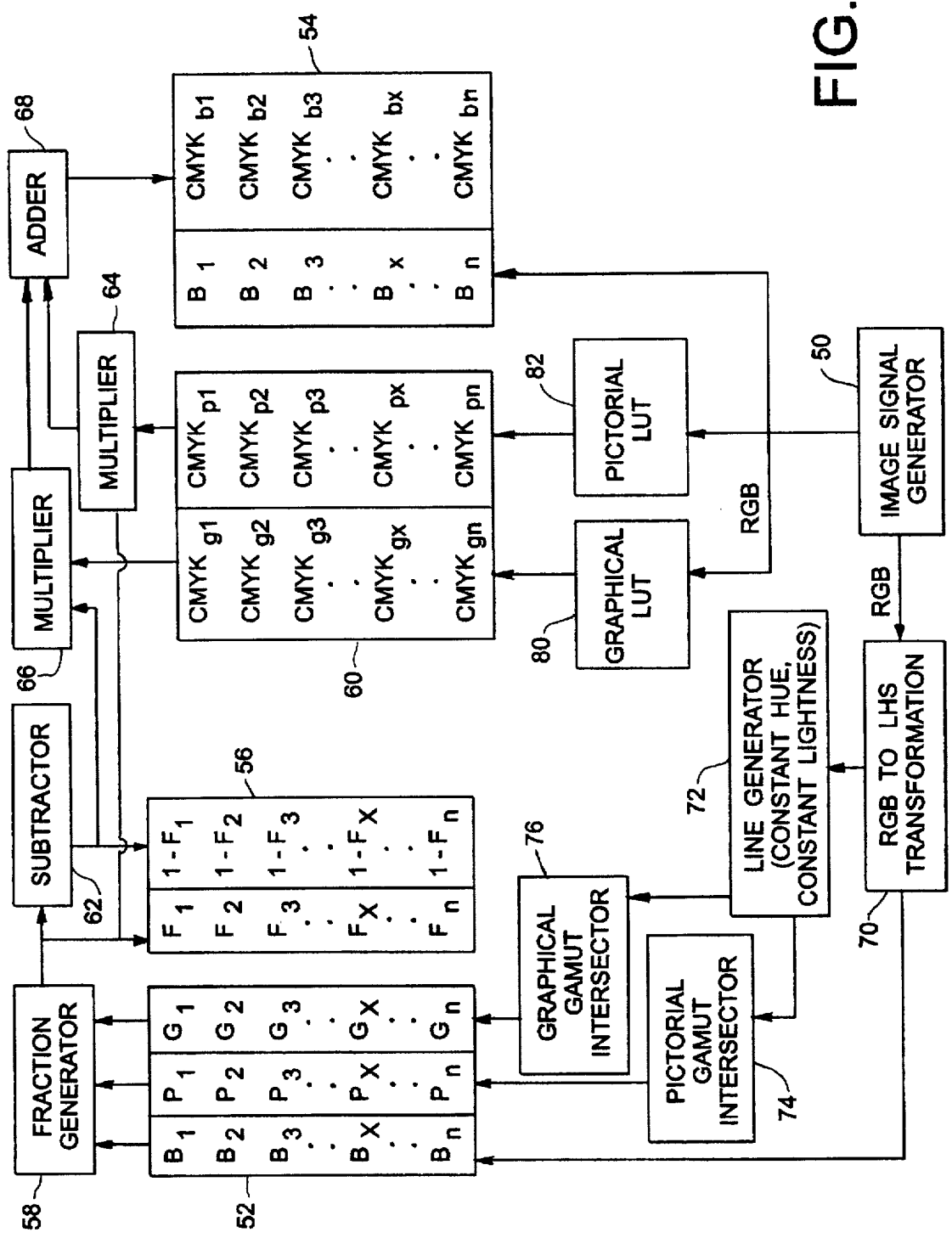
FIG. 3 is a schematic diagram illustrating table blending implemented in accordance with the present invention.

With reference to FIG. 3, the blended LUT generator 40 will now be more fully described. Image signal generator 50 generates a set of signals, $B_x$, which lie on a regular rectangular grid in RGB space. These values will become the indexing nodes of blended LUT 54.

For each $B_x$, a corresponding point in LHS (luminance, hue, saturation) space is calculated by the RGB to LHS transformation 70 using a reasonable set of RGB primaries (i.e. CRT phosphors). $P_x$ and $G_x$ are found for each $B_x$ in LHS space and entered in table 52 (though they also may be calculated on the fly) using the construction of FIG. 2. A line of constant lightness and hue is drawn from the neutral axis through $B_x$ by line generator 72. Pictorial gamut intersector 74 finds $P_x$, the point in LHS space where the line intersects the pictorial gamut, and the graphical gamut intersector 76 finds $G_x$, the point in LHS space where the line intersects the graphical (RGB) gamut. The weight $F_x$ is calculated from $B_x$, $P_x$ and $G_x$ by fraction generator 58 using the formulas previously described. 1−$F_x$ is calculated from $F_x$ by the subtractor 62, and they are entered in table 56, though they also can be calculated on the fly if desired.

The graphical CMYK values for $B_x$ are calculated using graphical LUT 80, the pictorial CMYK values for $B_x$ are calculated using pictorial LUT 82, and they are entered in table 60, though they also can be calculated on the fly if desired. These values are multiplied by the weights in table 56 in multipliers 64 and 66. An accumulator 68 adds the weighted CMYK printer signals, the result of which is mapped into the blended look-up table. It is to be understood that initially the pictorial and graphical look-up tables may not have image signal entries with hue and luminance values equal to a selected image signal entry. In this instance, an interpolation can be made with respect to the pictorial and/or graphical image signals to generate the required values.

Once the blended look-up table has been generated, the mappings are stored in memory of the image signal translator. Thereafter, image signals generated by the scanner are used to index the blended look-up table of the image signal translator to produce blended printer signals which drive printer 20. Images made using the blended look-up table produced reproductions with accurate pictorial colors and graphics sweeps which are more saturated and thus satisfactory.

It will no doubt be appreciated that the present invention can be accomplished using a software implementation, though a hardware circuit will probably provide optimum speed. It will no doubt be appreciated that the present invention can be implemented through a combination of software and hardware.

The invention has been described with reference to a particular embodiment. Modifications and alterations will occur to others upon reading and understanding this specification. It is intended that all such modifications and alterations are included insofar as they come within the scope of the appended claims or equivalents thereof.

Having thus described the invention, it is now claimed:

1. A method for generating a blended look-up table (LUT) which translates an image signal having both pictorial and graphical elements, into a blended printer signal, the method comprising the steps of:

generating a pictorial LUT for translating a pictorial image signal into a pictorial printer signal;

generating a pictorial LUT for translating a graphical image signal into a pictorial printer signal;

generating the image signal;

selecting a first pictorial printer signal from the image signal from the pictorial LUT;

selecting a first pictorial printer signal from the image signal from the graphical LUT;

generating weighting values for adjusting the first pictorial and graphical printer signals based upon relative differences of the image signal from the first pictorial printer signal and the first graphical printer signal, respectively;

adjusting the first pictorial and graphical printer signals according to the weighting values;

associating the adjusted first pictorial and graphical printer signals to derive a blended printer signal; and, mapping the blended printer signal to the image signal.

2. The method of claim 1 wherein the pictorial look-up table translates pictorial image signals into pictorial printer signals for image signals that are within a pictorial gamut of the printer.

3. The method of claim 1 wherein the associating comprises blending the adjusted first graphical printer signal with the first pictorial printer signal and wherein the image signal is outside a pictorial gamut of the printer.

4. The method of claim 1, wherein the generating weighting values comprises deriving relative distances between the image signal and a predetermined point on a surface of a pictorial gamut, and between the image signal and a predetermined point on a surface of a graphical gamut.

5. The method of claim 4, wherein the predetermined points on the surface of the pictorial and graphical gamuts have a lightness and hue equal to that of the image signal, and the relative distances comprise differences in saturation.

6. The method of claim 5 wherein the weighting values comprise a first weighting value for association with the first pictorial printer signal and a second weighting value for association with the first graphical printer signal, and wherein the first and second weighting values are generated in proportion to the relative differences in saturation, respectively.

7. The method of claim 6 wherein the adjusting comprises multiplying the first pictorial printer signal with the first weighting value, and multiplying the first graphical printer signal with the second weighting value.

8. The method of claim 1 wherein the associating comprises adding the adjusted first pictorial and graphical printer signals to generate the blended printer signal.

9. A method of generating a printer look-up table for mapping image signals to blended printer signals, the method comprising the steps of:

generating a pictorial look-up table (LUT) which maps points on a surface of a printer pictorial gamut to pictorial printer signals;

generating a graphical LUT which maps points on a surface of a printer graphical gamut to graphical printer signals;

generating a set of image signals having hue, luminance and saturation, each image signal comprising pictorial and graphical elements;

selecting one of the image signals;

selecting associated points on the surface of the pictorial and graphical gamuts that have hue and luminance corresponding to the selected image signal;

calculating (1) a difference in saturation $\Delta X_1$ between the selected image signal and the selected associated point on the surface of the graphical gamut, and (2) a difference in saturation $\Delta X_2$ between the selected image signal and the selected associated point on the surface of the pictorial gamut;

weighting pictorial and graphical printer signals mapped to the points on the surface of the pictorial and graphical gamuts by f and 1–f, respectively, where f is a function of:

$$\frac{\Delta X_1}{\Delta X_1 + \Delta X_2};$$

adding the weighted pictorial and graphical printer signals to form a blended printer signal; and, mapping the blended printer signal to the selected image signal.

10. The method of claim 9 wherein the pictorial and graphical printer signals are weighted by multiplying the pictorial and graphical printer signals by f and 1–f respectively.

11. The method of claim 10 wherein the image signal is disposed between the pictorial gamut and the graphical gamut.

12. An apparatus for blending printer look-up tables (LUT), said apparatus including:

a first memory which stores a pictorial LUT representative of a pictorial gamut of a printer, for converting first image signals into first printer signals wherein a printing of a first printer signal on the printer comprises a faithful color reproduction of a first image signal;

a second memory which stores a graphical LUT representative of a graphical gamut of the printer, for converting second image signals into second printer signals wherein a printing of a second printer signal on the printer comprises a saturated color reproduction of a second image signal, said graphical gamut being spaced in chrominance from the pictorial gamut; and, a signal processor in data communication with the first and second memories, for generating a blended printer signal as a function of the first and second printer signals wherein a third image signal, intermediate said pictorial and graphical gamuts, is mapped to the blended printer signal based upon relative difference between the third image signal and a corresponding printer signal of the pictorial gamut and a corresponding printer signal of the graphical gamut.

13. The apparatus as defined in claim 12 wherein the blended printer signal corresponds to an image signal having a predetermined relationship to the first image signal and the second image signal.

14. The apparatus as defined in claim 13 wherein the predetermined relationship comprises a common hue and luminance and a relative difference in chrominance.

15. The apparatus as defined in claim 14 wherein the function comprises a computation of proportional differences in chrominance between the first image signal and the image signal, and between the second image signal and the image signal.

16. The apparatus as defined in claim 15 wherein the signal processor comprises:

a means for measuring (1) $\Delta X_1$, the proportional chrominance difference between the image signal and the second image signal, and (2) $\Delta X_2$, the proportional chrominance difference between the image signal and the first image signal;

a means for multiplying the first and second printer signals from the pictorial and graphical LUTs by f and 1−f respectively, where f is a function of:

$$\frac{\Delta X_1}{\Delta X_1 + \Delta X_2};$$

and an accumulator which adds the multiplied printer signals.

17. In an appropriately programmed digital computer which includes a memory for storing color printer look-up tables for translating image signals into printer signals for an associated color printer, a method used in blending at least two printer look-up tables, the method comprising the steps of:

selecting a first image signal;

reading from memory a first printer signal mapped to the first image signal by a first printer look-up table;

selecting a second image signal;

reading from memory a second printer signal mapped to the second image signal by a second look-up table;

weighting the first printer signal by multiplying the first printer signal by a first weighting value;

weighting the second printer signal by multiplying the second printer signal by a second weighting value;

generating a third printer signal by adding the weighted first and second printer signals.

18. The method of claim 17 further comprising the steps of:

generating a third image signal defined in hue, luminance, and saturation space;

storing the third image signal in memory mapped to the third printer signal; and wherein the first and second image signals are selected as having a hue and luminance equal to the inputted third image signal.

19. The method of claim 18 further comprising the steps of:

calculating (1) a difference in saturation $\Delta X_1$ between the second and third image signals and (2) a difference in saturation $\Delta X_2$ between the first and second image signals;

calculating the first and second weighting values as a function of:

$$\frac{\Delta X_1}{\Delta X_1 + \Delta X_2}.$$

20. The method of claim 18 wherein the first look-up table defines a pictorial look-up table which relates to a pictorial gamut of the associated printer, and the second look-up table defines a graphical look-up table which relates to a graphical gamut of the associated printer.

* * * * *

UNITED STATES PATENT AND TRADEMARK OFFICE
CERTIFICATE OF CORRECTION

PATENT NO. : 5,734,802
APPLICATION NO. : 08/608867
DATED : March 31, 1998
INVENTOR(S) : Martin S. Maltz et al.

It is certified that error appears in the above-identified patent and that said Letters Patent is hereby corrected as shown below:

In the claims:

column 7, lines 24 and 25, Claim 1, replace the two occurrences of "pictorial" with --graphical-- column 7, line 29, Claim 1 replace "pictorial" with --graphical-- column 9, line 1, Claim 12, replace "difference" with --differences--

Signed and Sealed this

Ninth Day of February, 2010

David J. Kappos
*Director of the United States Patent and Trademark Office*